(12) United States Patent
Wang

(10) Patent No.: US 12,121,178 B2
(45) Date of Patent: Oct. 22, 2024

(54) DOUBLE-BOTTOM ENAMEL PAN WITH GOOD THERMAL CONDUCTIVITY

(71) Applicant: Ningbo Golden Elephant Kitchenware Co., Ltd., Ningbo (CN)

(72) Inventor: Cheng Wang, Ningbo (CN)

(*) Notice: Subject to any disclaimer, the term of this patent is extended or adjusted under 35 U.S.C. 154(b) by 148 days.

(21) Appl. No.: 17/659,899

(22) Filed: Apr. 20, 2022

(65) Prior Publication Data

US 2023/0270283 A1  Aug. 31, 2023

(51) Int. Cl.
A47J 36/02 (2006.01)

(52) U.S. Cl.
CPC ................... *A47J 36/025* (2013.01)

(58) Field of Classification Search
CPC ........ A47J 36/025; A47J 27/002; A47J 36/02; A47J 37/10
See application file for complete search history.

(56) References Cited

U.S. PATENT DOCUMENTS

| | | | | |
|---|---|---|---|---|
| 10,478,012 B2* | 11/2019 | Groll | .................. | B32B 3/266 |
| 11,364,706 B2* | 6/2022 | Groll | .................. | A47J 36/02 |
| 11,464,358 B1* | 10/2022 | Mitrik | .................. | A47J 36/06 |
| 2012/0273482 A1* | 11/2012 | Amprimo | .............. | A47J 27/002 |
| | | | | 156/230 |
| 2015/0108143 A1* | 4/2015 | Groll | .................. | A47J 27/002 |
| | | | | 220/573.2 |
| 2017/0325627 A1* | 11/2017 | Park | .................. | B32B 18/00 |
| 2022/0110475 A1* | 4/2022 | Cheng | .................. | B32B 3/12 |
| 2022/0225822 A1* | 7/2022 | Aubin | .................. | A47J 36/02 |

\* cited by examiner

*Primary Examiner* — Shawn M Braden
(74) *Attorney, Agent, or Firm* — Prakash Nama; Global IP Services, PLLC

(57) ABSTRACT

A double-bottom enamel pan with good thermal conductivity, comprising a pan body and a double-bottom piece which is connected to an outer surface of a bottom of the pan body, wherein the double-bottom piece is provided with a plurality of annular bumps on one side matching with the pan body, the annular bumps are pressed into the pan body, and the double-bottom piece comprises at least one layer of enamel coating. The double-bottom enamel pan of the utility model has good thermal conductivity, so that heat and temperature distribution at the bottom of the pan body is uniform, which meets the user's requirements of excellent service effect and long service life, and has a broad market application prospect.

7 Claims, 3 Drawing Sheets

DOUBLE-BOTTOM ENAMEL PAN WITH GOOD THERMAL CONDUCTIVITY

BACKGROUND

1. Field

The utility model relates to the technical field of cooking utensils, and particularly relates to a double-bottom enamel pan with good thermal conductivity.

2. Description of the Related Art

The innovation of cooking utensil products, including products such as cooking pans, frying pans, stir-frying pans, milk pans and induction cookers, meets the increasing requirements of people for high-quality life. A cooking utensil with good thermal conductivity will provide a user with better cooking effect and experience, whereas non-stick pans widely used on the market at present have poor heat transfer or non-uniform heat distribution at a bottom of each pan body, which may influence cooking effect, cause food in the pan body to burn and scorch, and even shorten service life of the cooking utensil products when serious enough.

SUMMARY

In view of the above-mentioned defects in the prior art, a technical problem to be solved by the utility model is that the non-uniform heat transfer at the bottom of the pan body of the cooking utensil products such as the non-stick pans leads to poor cooking effect and shortens the service life of the products.

To achieve the above purpose, the utility model adopts the following technical solution:

A double-bottom enamel pan with good thermal conductivity, comprising a pan body and a double-bottom piece which is connected to an outer surface of a bottom of the pan body, wherein the double-bottom piece is provided with a plurality of annular bumps on one side matching with the pan body, the annular bumps are pressed into the pan body, and the double-bottom piece comprises at least one layer of enamel coating.

Preferably, the annular bumps are arranged in an annular array on the double-bottom piece.

Preferably, the enamel coating has a thickness of 50-70 μm.

Preferably, the outer surface of the bottom of the pan body has a roughness of Ra2.8-Ra3.5.

Preferably, the pan body is also provided with a handle.

Preferably, the pan body is made of aluminum alloy.

Preferably, the pan body is also provided with a non-stick layer on an inner surface.

Preferably, the non-stick layer has a thickness of 25-40 μm.

The utility model has the following beneficial effects:

The double-bottom enamel pan of the utility model has good thermal conductivity at the bottom of the pan body by arrangement of the double-bottom enamel piece, so that heat and temperature distribution at the bottom of the pan body is uniform, and cooking effect and product service life are improved for users. The double-bottom enamel pan of the utility model also has the characteristics of scaling resistance, easy cleaning and bright color, and has a broad market application prospect.

DETAILED DESCRIPTION

The following description is used to disclose the utility model so as to enable those skilled in the art to realize the utility model. The preferred embodiment in the following description is only an example, and those skilled in the art can think of other obvious variations.

Specific Embodiment

Figure 1:
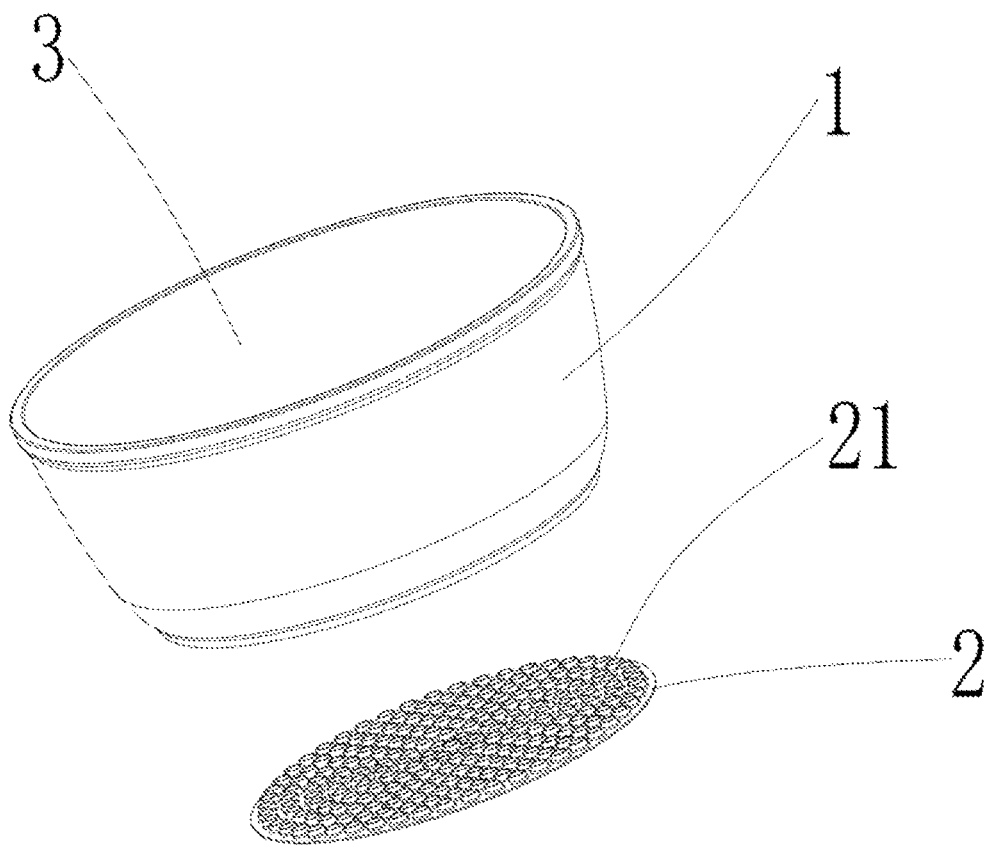
FIG. 1 is a structural schematic diagram of a double-bottom enamel pan of the utility model.
Figure 2:
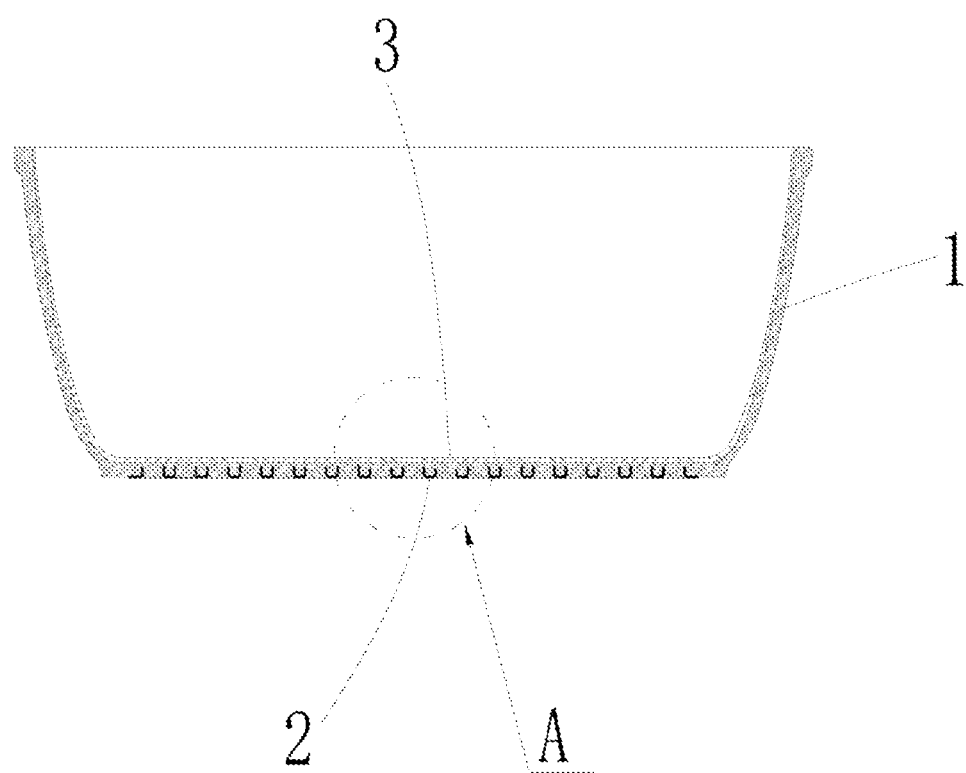
FIG. 2 is a sectional view of a double-bottom enamel pan of the utility model.
Figure 3:
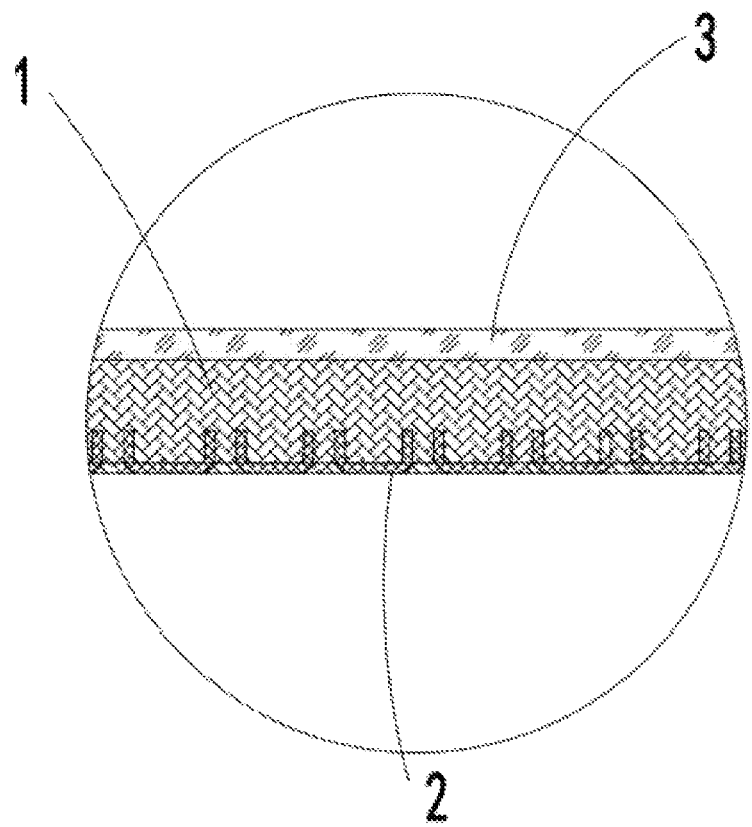
FIG. 3 is a local enlarged view of Position A in FIG. 1 of the utility model.

The utility model provides a double-bottom enamel pan with good thermal conductivity, as shown in FIGS. 1-3, comprising a pan body 1 and a double-bottom piece 2 which is connected to an outer surface of a bottom of the pan body 1, wherein the pan body 1 is made of aluminum alloy, the double-bottom piece 2 is provided with a plurality of annular bumps 21 on one side matching with the pan body 1, and the annular bumps 21 are arranged in an annular array on the double-bottom piece 2; the double-bottom piece 2 is fixedly connected with the bottom of the pan body 1 through the annular bumps 21, the double-bottom piece 2 and the bottom of the pan body 1 are processed by compression molding with a machine to press the annular bumps 21 into pan body 1; the double-bottom piece 2 is made of stainless steel and comprises a layer of enamel coating, by spraying the enamel coating on the double-bottom piece 2, panel scratching of a ceramic cooktop can be prevented, cooking experience of users can be improved, and service life of the double-bottom enamel pan can be prolonged. The enamel coating adopts a known enamel material. Enamel material, also known as porcelain enamel, is a composite material with good toughness, high impact resistance and long service life, and is environment-friendly.

The enamel coating has a thickness of 50-70 μm.

The outer surface of the bottom of the pan body 1 has a roughness of Ra2.8-Ra3.5.

The pan body 1 is also provided with a handle. The handle is externally wrapped with a rubber, plastic or wooden heat insulation material for better safety when used.

The pan body 1 is also provided with a non-stick layer 3 on an inner surface. The non-stick layer 3 has a thickness of 25-40 μm. By arrangement of the non-stick layer 3, serviceable range of products is broadened, and use of different cooking utensil products can be achieved. The non-stick layer 3 adopts water-based fluororesin non-stick coating and ceramic coating in the prior art.

The above shows and describes the basic principle, main features and advantages of the utility model. Those skilled in the art shall understand that the utility model is not limited by the above embodiments. The above embodiment and description merely illustrate the principle of the utility model. Various changes and improvements can also be made to the utility model without departing from the spirit and scope of the utility model, and shall fall into the scope of the utility model.

What is claimed is:

1. A double-bottom enamel pan comprising a pan body and a double-bottom piece which is connected to an outer surface of a bottom of the pan body, wherein the double-bottom piece is provided with a plurality of annular bumps on one side matching with the pan body, the annular bumps are pressed into the pan body, and the double-bottom piece comprises at least one layer of enamel coating, and wherein the outer surface of the bottom of the pan body has a roughness of Ra2.8-Ra3.5.

2. The double-bottom enamel pan according to claim 1, wherein the annular bumps are arranged in an annular array on the double-bottom piece.

3. The double-bottom enamel pan according to claim 1, wherein the enamel coating has a thickness of 50-70 μm.

4. The double-bottom enamel pan according to claim 1, wherein the pan body is also provided with a handle.

5. The double-bottom enamel pan with according to claim 1, wherein the pan body is made of aluminum alloy.

6. The double-bottom enamel pan with according to claim 1, wherein the pan body is also provided with a non-stick layer on an inner surface.

7. The double-bottom enamel pan according to claim 6, wherein the non-stick layer has a thickness of 25-40 μm.

* * * * *

UNITED STATES PATENT AND TRADEMARK OFFICE
CERTIFICATE OF CORRECTION

| | | |
|---|---|---|
| PATENT NO. | : 12,121,178 B2 | Page 1 of 1 |
| APPLICATION NO. | : 17/659899 | |
| DATED | : October 22, 2024 | |
| INVENTOR(S) | : Cheng Wang | |

It is certified that error appears in the above-identified patent and that said Letters Patent is hereby corrected as shown below:

On the Title Page

Column 1 in item (30), please Include the Foreign Application Priority Data -- February 28, 2022 (CN).......................202220405492.2 --

Signed and Sealed this
Tenth Day of December, 2024

*Katherine Kelly Vidal*

Katherine Kelly Vidal
*Director of the United States Patent and Trademark Office*